US008005788B2

(12) United States Patent
Leroux et al.

(10) Patent No.: US 8,005,788 B2
(45) Date of Patent: Aug. 23, 2011

(54) SYSTEM AND METHOD FOR LEGACY SYSTEM COMPONENT INCREMENTAL MIGRATION

(75) Inventors: Daniel D. J. Leroux, Kanata (CA); Steven R. Shaw, Ottawa (CA)

(73) Assignee: International Business Machines Corporation, Armonk, NY (US)

( * ) Notice: Subject to any disclaimer, the term of this patent is extended or adjusted under 35 U.S.C. 154(b) by 344 days.

(21) Appl. No.: 12/020,756

(22) Filed: Jan. 28, 2008

(65) Prior Publication Data
US 2009/0193063 A1 Jul. 30, 2009

(51) Int. Cl.
*G06F 17/30* (2006.01)

(52) U.S. Cl. ........ 707/624; 707/625; 707/637; 707/638; 707/639; 717/168; 717/174; 709/217; 709/223; 709/203

(58) Field of Classification Search ............... 707/999.2, 707/624, 625, 637, 638, 639, 999.002, 999.001, 707/999.01, 999.104; 717/20, 168, 174; 706/45; 715/745, 744; 709/223, 245, 217, 709/203
See application file for complete search history.

(56) References Cited

U.S. PATENT DOCUMENTS

| | | | | |
|---|---|---|---|---|
| 5,604,896 A * | 2/1997 | Duxbury et al. | ................. | 703/26 |
| 6,334,215 B1 | 12/2001 | Barker et al. | | |
| 6,374,268 B1 * | 4/2002 | Testardi | ........................ | 707/822 |
| 6,473,794 B1 * | 10/2002 | Guheen et al. | ................. | 709/223 |
| 6,662,357 B1 * | 12/2003 | Bowman-Amuah | .......... | 717/120 |
| 6,957,186 B1 * | 10/2005 | Guheen et al. | ................. | 705/323 |
| 7,143,189 B2 * | 11/2006 | Cohen et al. | .................. | 709/245 |
| 7,165,088 B2 * | 1/2007 | Cohen et al. | .................. | 709/203 |
| 7,167,914 B2 * | 1/2007 | Cohen et al. | .................. | 709/223 |
| 7,243,089 B2 * | 7/2007 | Becker-Szendy et al. | ............ | 1/1 |
| 7,257,597 B1 * | 8/2007 | Pryce et al. | ........................... | 1/1 |
| 7,280,536 B2 * | 10/2007 | Testardi | ........................ | 370/355 |
| 7,610,298 B2 * | 10/2009 | Zaytsev et al. | ........................ | 1/1 |
| 7,685,083 B2 * | 3/2010 | Fairweather | .................... | 706/45 |
| 7,685,140 B2 * | 3/2010 | Jackson | ..................... | 707/999.1 |
| 2002/0138570 A1 | 9/2002 | Hickey | | |
| 2003/0055921 A1 | 3/2003 | Kulkarni et al. | | |

(Continued)

OTHER PUBLICATIONS

Brodie et al., "Darwin: On the Incremental Migration of Legacy Information Systems," Mar. 1993, 2 pages, available as a Technical Memorandum of Electronics Research Laboratory, College of Engineering, University of California, Berkley.

(Continued)

*Primary Examiner* — Jean M Corrielus
(74) *Attorney, Agent, or Firm* — Daniel McLoughlin; Hoffman Warnick LLC

(57) ABSTRACT

A system and method for legacy system component incremental migration from a legacy system to a new system comprises a read-only ghost or shadow in the new system. When changes are made in the legacy system, the changes are incrementally and automatically migrated to the new system allowing the legacy system and the new system to maintain availability during the migration. The concept of "mastership" is used where a component exists in the "New System", but is actually mastered in the "Legacy System". By allowing a sub-component to exist as a read-only ghost or shadow in the new system, and still be mastered/edited in the legacy system, a one-way bridge is provided so that the two systems can interact. The synchronization of the legacy system component is managed so that the ghost component is automatically updated when changes are made to the legacy system component and there is little maintenance that the user needs to do to create the bridge between the two systems.

18 Claims, 10 Drawing Sheets

U.S. PATENT DOCUMENTS

| | | | |
|---|---|---|---|
| 2004/0158820 | A1 | 8/2004 | Moore et al. |
| 2005/0114291 | A1* | 5/2005 | Becker-Szendy et al. ........ 707/1 |
| 2006/0036895 | A1 | 2/2006 | Henrickson |
| 2006/0041862 | A1 | 2/2006 | Moussallam et al. |
| 2006/0106877 | A1 | 5/2006 | Lee |
| 2006/0206599 | A1 | 9/2006 | Milligan et al. |
| 2006/0222163 | A1 | 10/2006 | Bank et al. |
| 2006/0235899 | A1 | 10/2006 | Tucker |
| 2007/0255685 | A1* | 11/2007 | Boult et al. ........................ 707/2 |
| 2009/0037896 | A1* | 2/2009 | Grechanik et al. ............ 717/168 |

OTHER PUBLICATIONS

Wu et al., "Legacy System Migration: A Legacy Data Migration Engine," Oct. 12-14, 1997, 10 pages, Proceedings of the 17$^{th}$ International Database Conference (DATASEM '97), Brno, Czech Republic.

Bianchi et al., "Iterative Reengineering of Legacy Systems," pp. 1-31, No Date available, University of Bari, Italy.

Zou et al., "Towards a Web-centric Legacy System Migration Framework," pp. 1-5, No Date available, University of Waterloo, Canada.

* cited by examiner

Figure 3  Big Bang Theory of Operation
Prior Art

Figure 5 Legacy System Maintenance
Prior Art

Figure 6 Incremental Migration Theory of Operation

Figure 7 Incremental Migration Theory of Operation

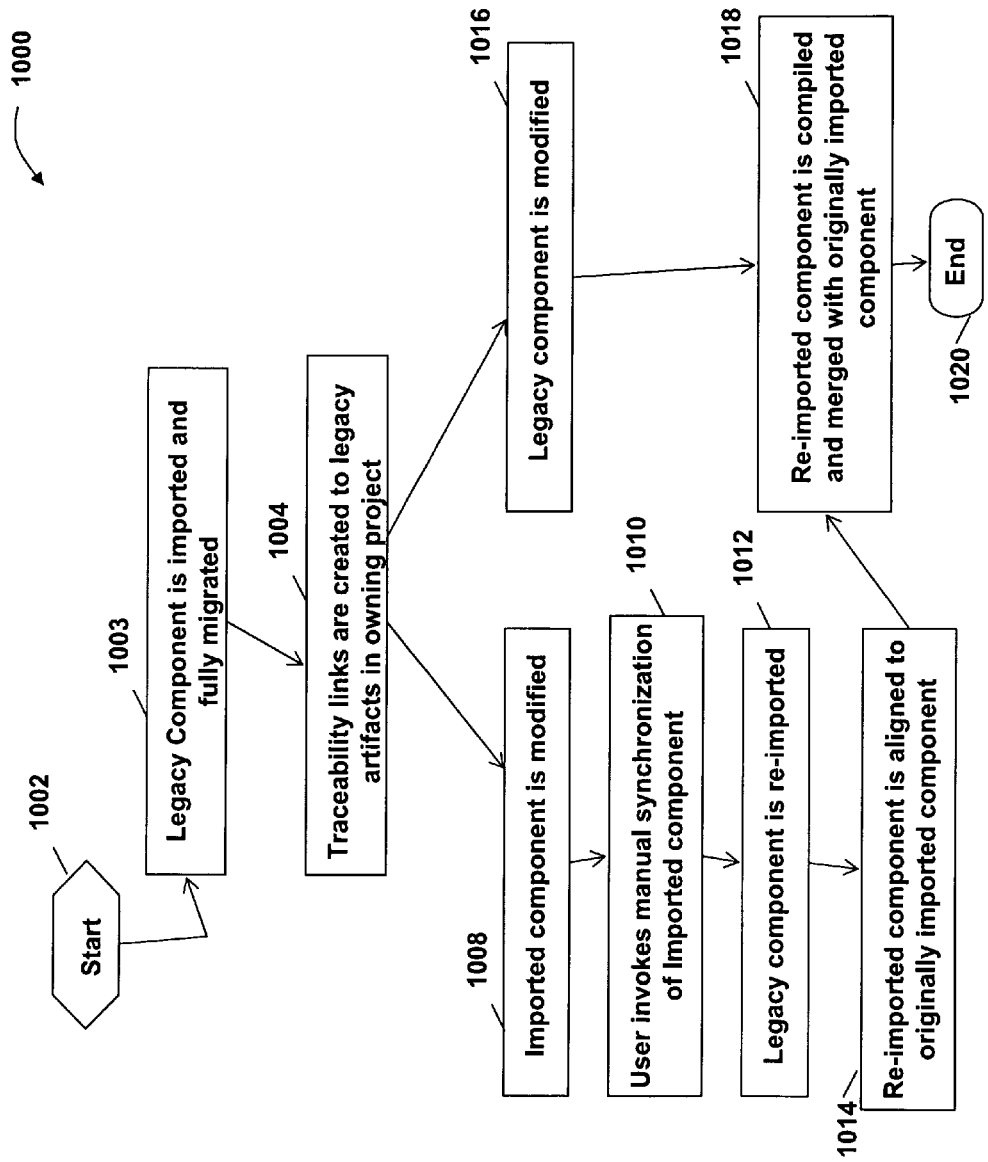

SYSTEM AND METHOD FOR LEGACY SYSTEM COMPONENT INCREMENTAL MIGRATION

BACKGROUND OF THE INVENTION

1. Field of the Invention

The present invention generally relates to legacy systems and, more specifically, the present invention provides a system and method for legacy system component incremental migration.

2. Related Art

Software systems are evolutionary in that they typically change over time. These changes can be minor and don't require any considerable effect. Or, they can be major which causes the schema to change and consequently precipitates a major migration effect to move the legacy system to the new system. Of course, as is well-known, a legacy system is an old computer system or application program which continues to be used because the user (typically an organization) does not want to replace or redesign it. The software system may be a tool which manages compilation of a programming language or, alternatively, it could be a database schema which is changing to a new version. One example of a programming tool is a UML development environment that is focused on creating artifacts based on the UML 1.4 specification. In the field of software engineering, the Unified Modeling Language (UML) is a standardized specification language for object modeling. UML is a general-purpose modeling language that includes a graphical notation used to create an abstract model of a system, referred to as a UML model. UML is officially defined at the Object Management Group (OMG) by the UML metamodel, a Meta-Object Facility metamodel (MOF). Like other MOF-based specifications, the UML metamodel and UML models may be serialized in XML. UML was designed to specify, visualize, construct, and document software-intensive systems. A new system could be new version of the development environment that is based on the UML 2.0 specification.

Using this example, although there is a mapping from the UML 1.4 to 2.0 specifications, the schemas are different enough that there is no backwards compatibility and a concentrated import must be performed in order for the UML 1.4 artifacts to be converted to UML 2.0. The same paradigm could be applied to databases, where the tooling environment manages a particular database version and a new database version schema is introduced that are not backward compatible with the previous version.

An artifact is one of many kinds of tangible byproduct produced during the development of software. Some artifacts, e.g., use cases, class diagrams, and other UML models, requirements and design documents help describe the function, architecture, and design of software. "Artifact" is most commonly used in referring to the byproducts of software development rather than the product itself. The sense of artifacts as byproducts is similar to the use of the term artifact in science to refer to something that arises from the process in hand rather than the issue itself, i.e., concerned with the means rather than the end.

Often, migration from a legacy system to a new system is tackled in a "Big-Bang" theory of operation as shown in FIG. 3. This means simply that the legacy system 316 is shut-down ("Stop Development" 314) and migrated all at once to the new system using tools to convert any relevant artifacts (steps 304, 306) to the format understood by the new system 318. Realistically though, the legacy system 316 is usually kept in production for maintenance purposes and is still required while verification (step 308) of the new system 318 is in process.

FIG. 3 illustrates two partitions of workflow, one for the legacy system 316 and one for the new system 318. First, the legacy system data is prepared for the migration (step 304) which may entail some clean-up or refactoring then it is imported (step 306) through a filter/transformation mechanism into the new system 318.

From there, the content is usually verified and tested to ensure system integrity before it can be brought back into production (step 308). During this time, the legacy system is shut-down and not available (step 314). After the migration, the legacy system 316 may be brought back up for read-only access or to support data streams not being migrated to the new system (step 315). This system stoppage can be costly to an organization since it implies that the system is not processing data during this time. Very often, the data transformation can run into unforeseen issues which cause it to take longer than predicted which of course makes the system stoppage even more costly.

System software architecture is usually divided into components that represent different aspects or functionality within the system. (Alternatively, they can be hardware components which are generally faster but updating them is more difficult and more expensive.) The components depend on each other in a layered fashion where the core components are at the bottom of the dependency chain and the leaf or product components are at the top. The core components by their nature are reusable across different product level components and are critical to the execution of the system. Different product components may have different release cycles that require them to have schedules which aren't in sync. Since they may depend on the same core components, one product stack may be ready to migrate to the new system, but other product stack or stacks may not be ready due to schedule or release concerns. This means that the core components are by nature synchronized with the slowest moving product stack since the core components have to support all dependent components above them. Consequently the core components are generally not ready to migrate at the same time as the more progressive product components at the top of the dependency chain.

In the above example, as shown in FIG. 4, all of the product (leaf) components ("<<component>>") depend on "Core 1" 408. If "Product 3" 410 is ready to migrate, but "Product 1" 404 is not, "Product 3" 410 must wait for "Product 1" 404 to be at an appropriate stage in order for migration to proceed. The reason for this is that they are both dependent on "Core 1" 408.

It is perhaps naive to think that once the migration to the new system is complete, the legacy system will no longer be needed. In an ideal situation, the data can be 100% migrated and there is no longer a need to support the data or a subset of data on the legacy system. This will probably not happen often. If the legacy system is supporting a particular release of software, then it would need to support that release for its lifecycle. It would be too risky to release the software from the legacy system and immediately migrate it to the new system and subsequently support bug fixes. Issues from the field would not map directly into the new system and migrating data in a fix-pack which is supposed to address particular issues is foolhardy at best. This implies that the legacy system and new system need to co-exist for a period of time, which could be considerable depending on release schedules. Fixes or changes in data/software on the legacy side need to be propagated into the new system. If the differences between the data structure are considerable between the two systems, then a file system merge is not sufficient. (Merging is the act of reconciling multiple changes made to different copies of the same file for instance, by performing an automated difference analysis between two files and considering the differences between the two files alone to conduct the merge and makes a "best-guess" analysis to generate the resulting merge. Sometimes, merging requires user intervention to verify and sometimes correct the result of the merge prior to completing the merge event.) Generally, required changes would need to be integrated manually through code or data inspection for accuracy purposes.

Therefore, there exists a need for a solution that solves at least one of the deficiencies of the related art.

SUMMARY OF THE INVENTION

To address these concerns noted above, a system and method needs to be provided to do incremental migration of the different components within a system. The concept of "mastership" is introduced where a component can exist in the "New System", but is actually still mastered in the "Legacy System".

A system and method for legacy system component incremental migration from a legacy system to a new system comprises a read-only ghost or shadow in the new system. When changes are made in the legacy system, the changes are incrementally and automatically migrated to the new system allowing the legacy system and the new system to maintain availability during the migration. The concept of "mastership" is used where a component exists in the "New System", but is actually mastered in the "Legacy System".

By allowing a sub-component to exist as a read-only ghost or shadow in the new system, and still be mastered/edited in the legacy system, a one-way bridge is provided so that the two systems can interact. The synchronization of the legacy system component is managed so that the ghost component is automatically updated when changes are made to the legacy system component and there is little maintenance that the user needs to do to create the bridge between the two systems.

BRIEF DESCRIPTION OF THE DRAWINGS

These and other features of this invention will be more readily understood from the following detailed description of the various aspects of the invention taken in conjunction with the accompanying drawings in which:

FIG. 10 shows an embodiment of the manual component synchronization of the present invention.

Figure 1:
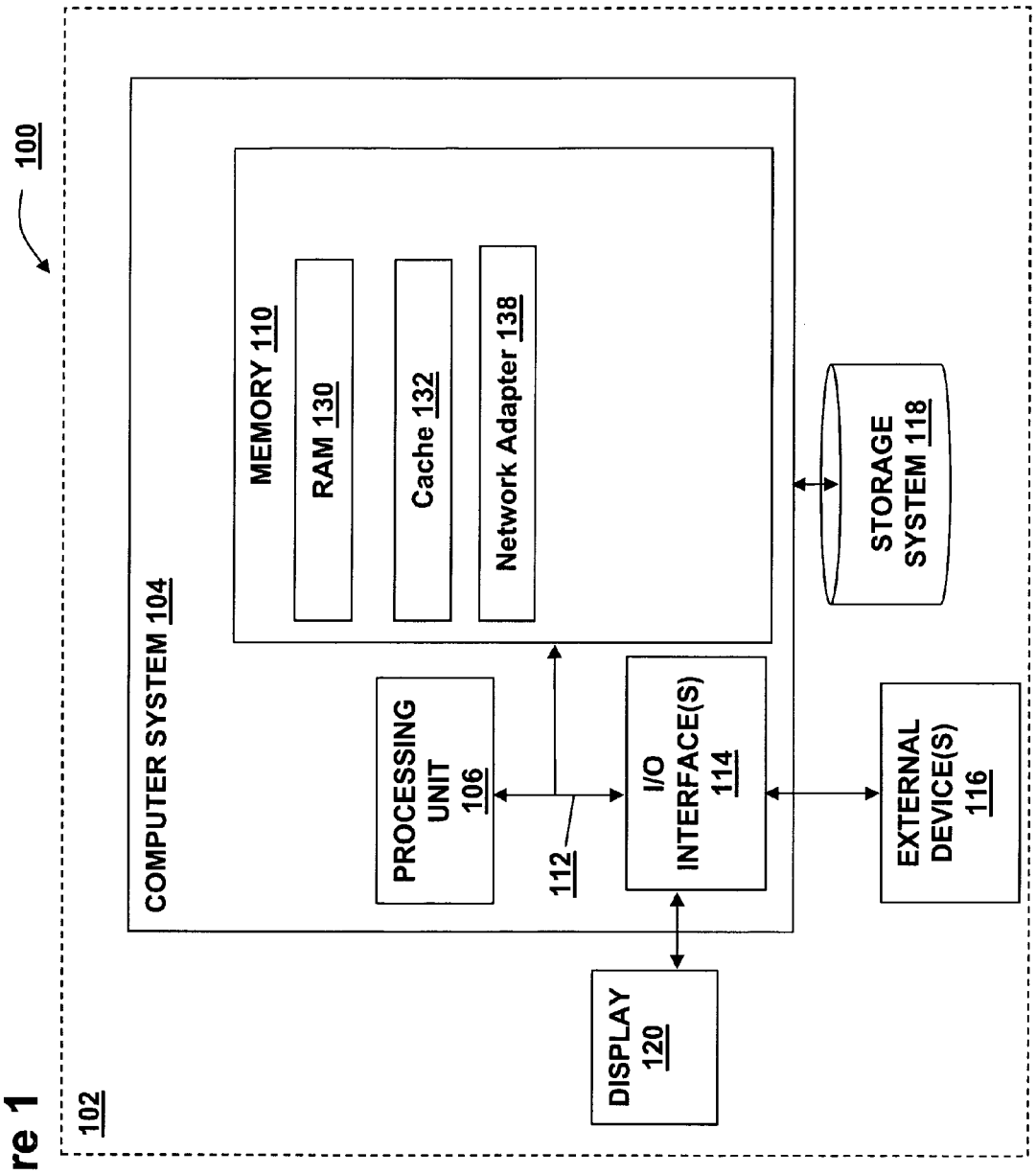
FIG. 1 shows a basic computer system for implementing the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represent like elements.

DETAILED DESCRIPTION OF THE PREFERRED EMBODIMENT

The present invention provides a system and method to migrate only particular components (such as the "Product 3" component which will be discussed in the context of the figures) into a new system by creating a shadow component of a core component (such as "Core 1" core component which will be discussed in the context of the figures). "Core 1" is still mastered in the legacy system and has no knowledge of the shadow component which exists in the new system. "Mastering" (such as in "master/slave") is a model for a communication protocol where one device or process (in this case, the legacy system) has unidirectional control over one or more other devices (in this case, the new system). When changes occur to "Core 1" in the legacy system, an auto-synchronization is invoked so that the component of "Core 1" is re-imported into the new system transparently to the end-user.

As a matter of background, a description of a data processing system in which the method and system of the present may be implemented is provided. A data processing system, such as that system 100 shown in FIG. 1, suitable for storing and/or executing program code (such as the code of the present invention) will include at least one processor (processing unit 106) coupled directly or indirectly to memory elements through a system bus. The memory elements can include local memory (RAM 130) employed during actual execution of the program code, bulk storage (storage 118), and cache memories (cache 132) which provide temporary storage of at least some program code in order to reduce the number of times code must be retrieved from bulk storage during execution. Input/output or I/O devices (external devices 116) (including but not limited to keyboards, displays, pointing devices, etc.) can be coupled to the system either directly or through intervening I/O controllers (I/O Interface 114).

Figure 2:
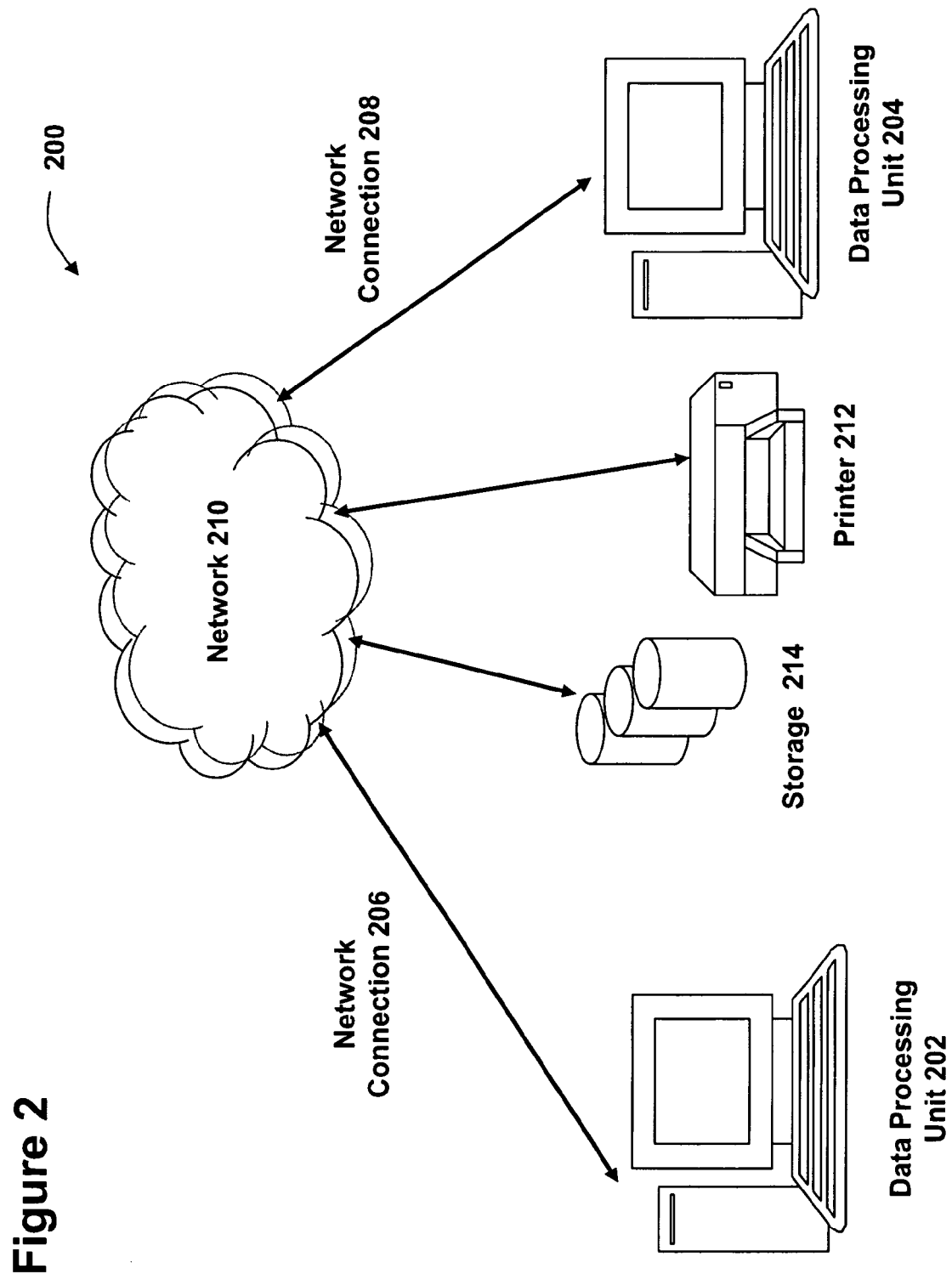
FIG. 2 shows an exemplary networking system which may be used to implement the method and system of the present invention.

Network adapters (network adapter 138) may also be coupled to the system to enable the data processing system (as shown in FIG. 2, data processing unit 202) to become coupled to other data processing systems (data processing unit 204) or remote printers (printer 212) or storage devices (storage 214) through intervening private or public networks (network 210). (A computer network is composed of multiple computers connected together using a telecommunication system for the purpose of sharing data, resources and communication. For more information, see http://historyoftheinternet.org/). Modems, cable modem and Ethernet cards are just a few of the currently available types of network adapters. (A network card, network adapter or NIC (network interface card) is a piece of computer hardware designed to allow computers to communicate over a computer network. It is both an OSI layer 1 (physical layer) and layer 2 (data link layer) device, as it provides physical access to a networking medium and provides a low-level addressing system through the use of MAC addresses. It allows users to connect to each other either by using cables or wirelessly.)

It should be understood that the present invention is typically computer-implemented via hardware and/or software. As such, and client systems and/or servers will include computerized components as known in the art. Such components typically include (among others), a processing unit, a memory, a bus, input/output (I/O) interfaces, external devices, etc.

Figure 6:
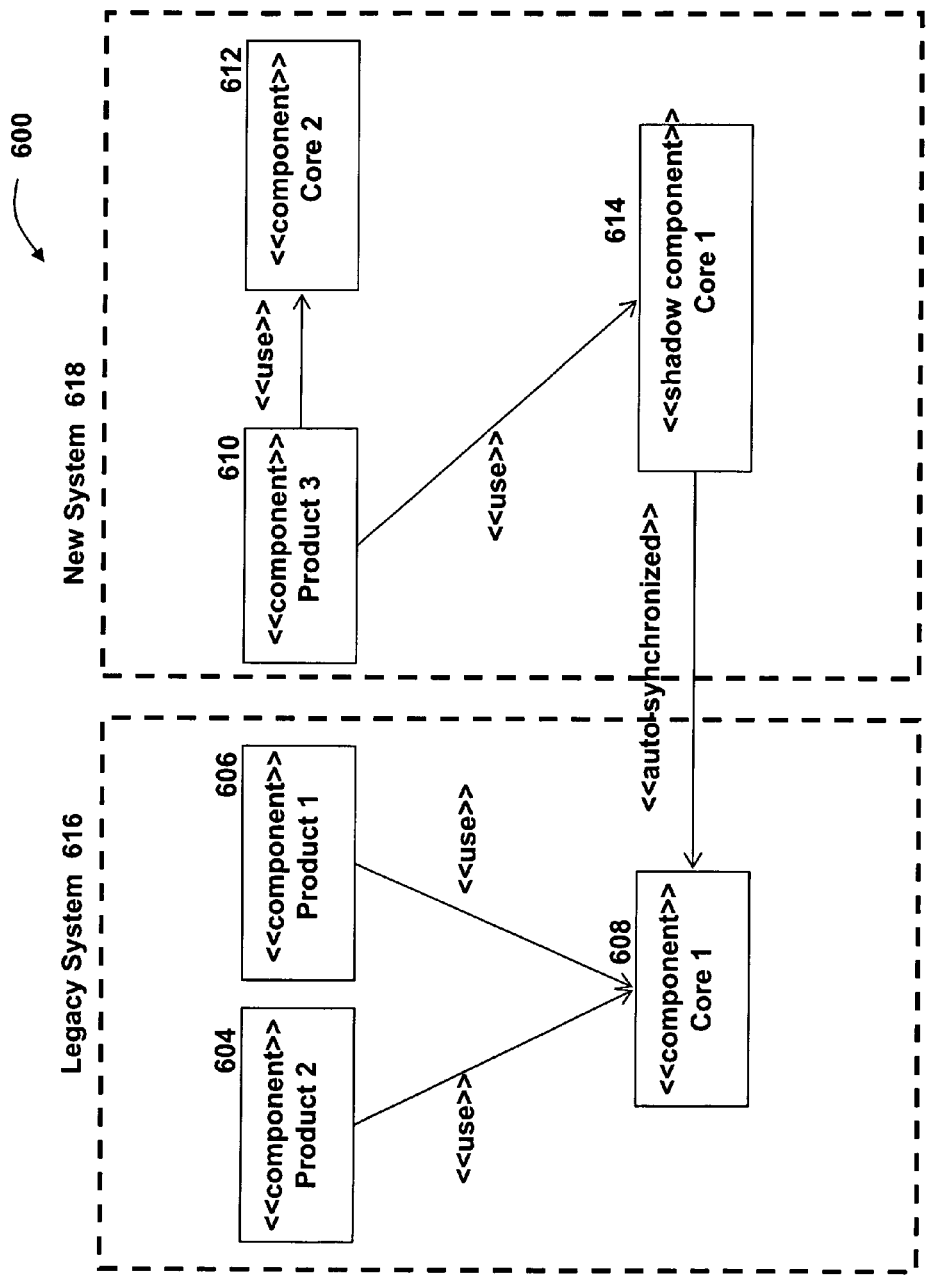
FIG. 6 shows the incremental migration theory of operation system of the present invention.

As noted above, the present invention provides a system and method to migrate a particular component (such as the "Product 3" component) into a new system by creating a shadow component to a core component (such as "Core 1" core component). "Core 1" is still mastered in the legacy system and has no knowledge of the shadow component which, once created, exists in the new system. This is shown in FIG. 6 having a legacy system 616 and a new system 618, Product 1, Product 2 and Product 3 606, 604, 610, Core 1 and Core 2 608, 612 and shadow component of Core 1 614 which provides a "shadow" of the <<component>> of Core 1 608 ("<<shadow component>>"). As can be seen, Product 1 606 and Product 2 604 use the <<components>> of Core 1 608, while Product 3 610 uses the <<component>> of Core 2 612 and the <<shadow component>> 614 of Core 1 608. The <<shadow component>> 614 of Core 1 auto-synchronizes with Core 1 608 <<component>>. When changes occur to "Core 1" in the legacy system, auto-synchronization is invoked where the component is re-imported into the new system transparently to the end-user.

Figure 3:
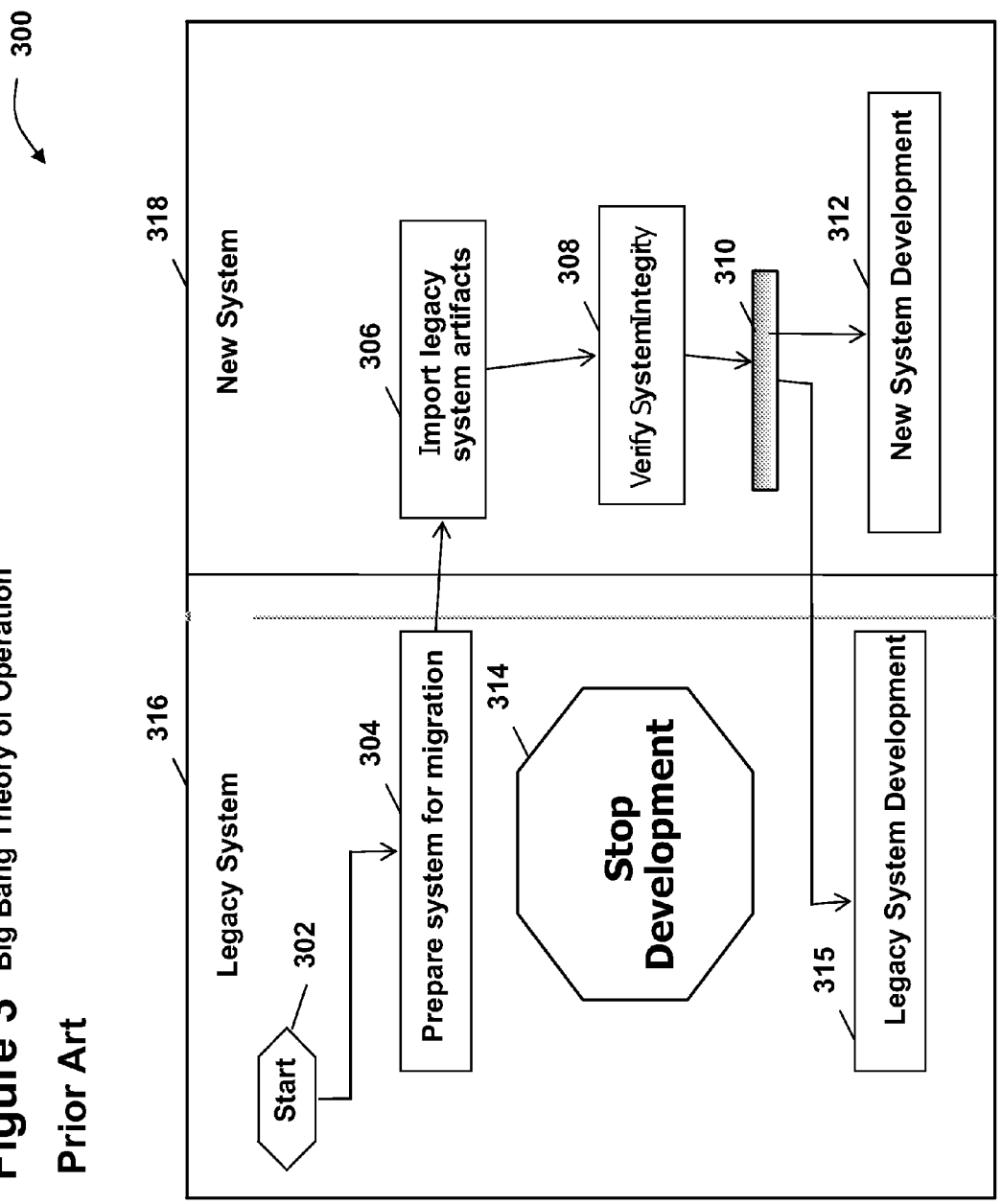
FIG. 3 shows a system ("Big Bang Theory of Operation") which has problems solved by the method and system of the present invention.
Figure 4:
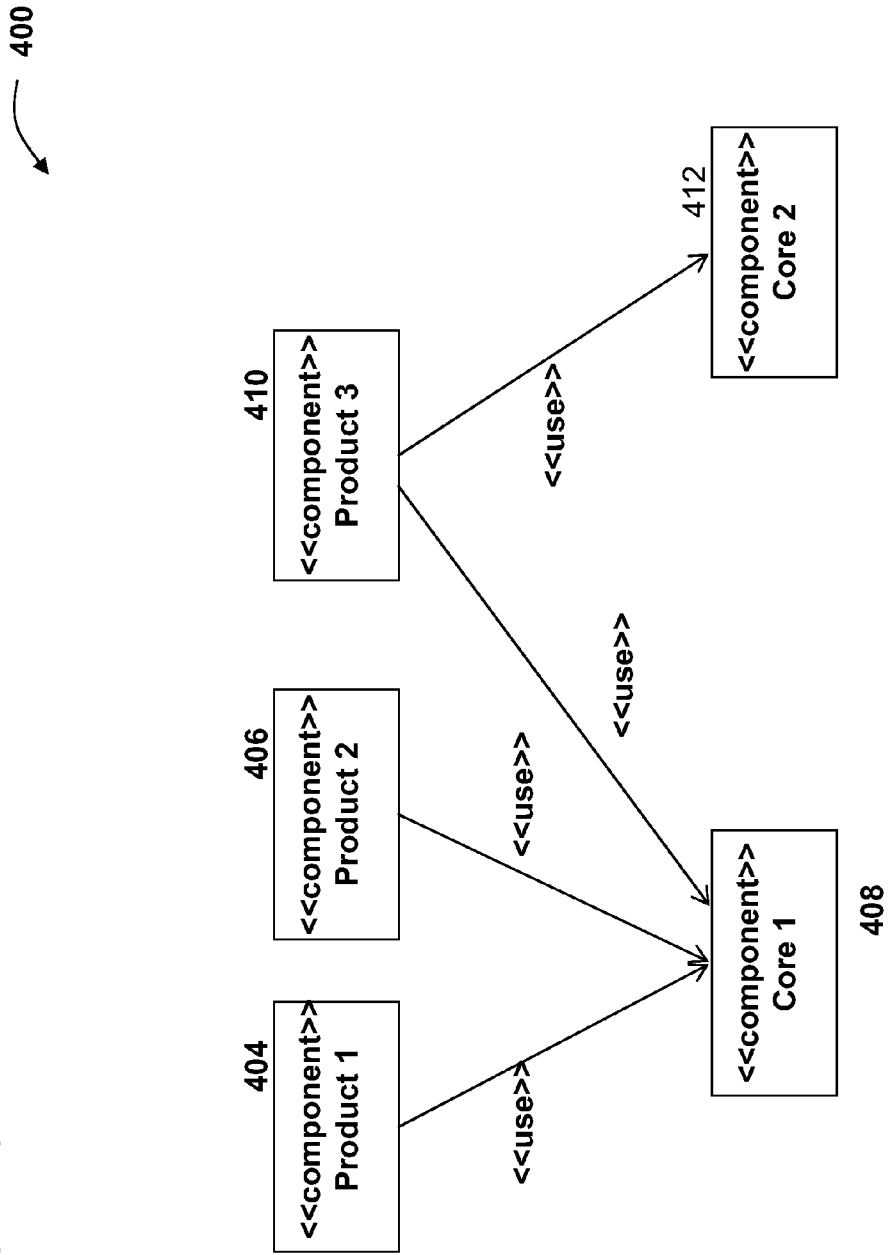
FIG. 4 shows a system of the prior art which has problems solved by the method and system of the present invention.
Figure 5:
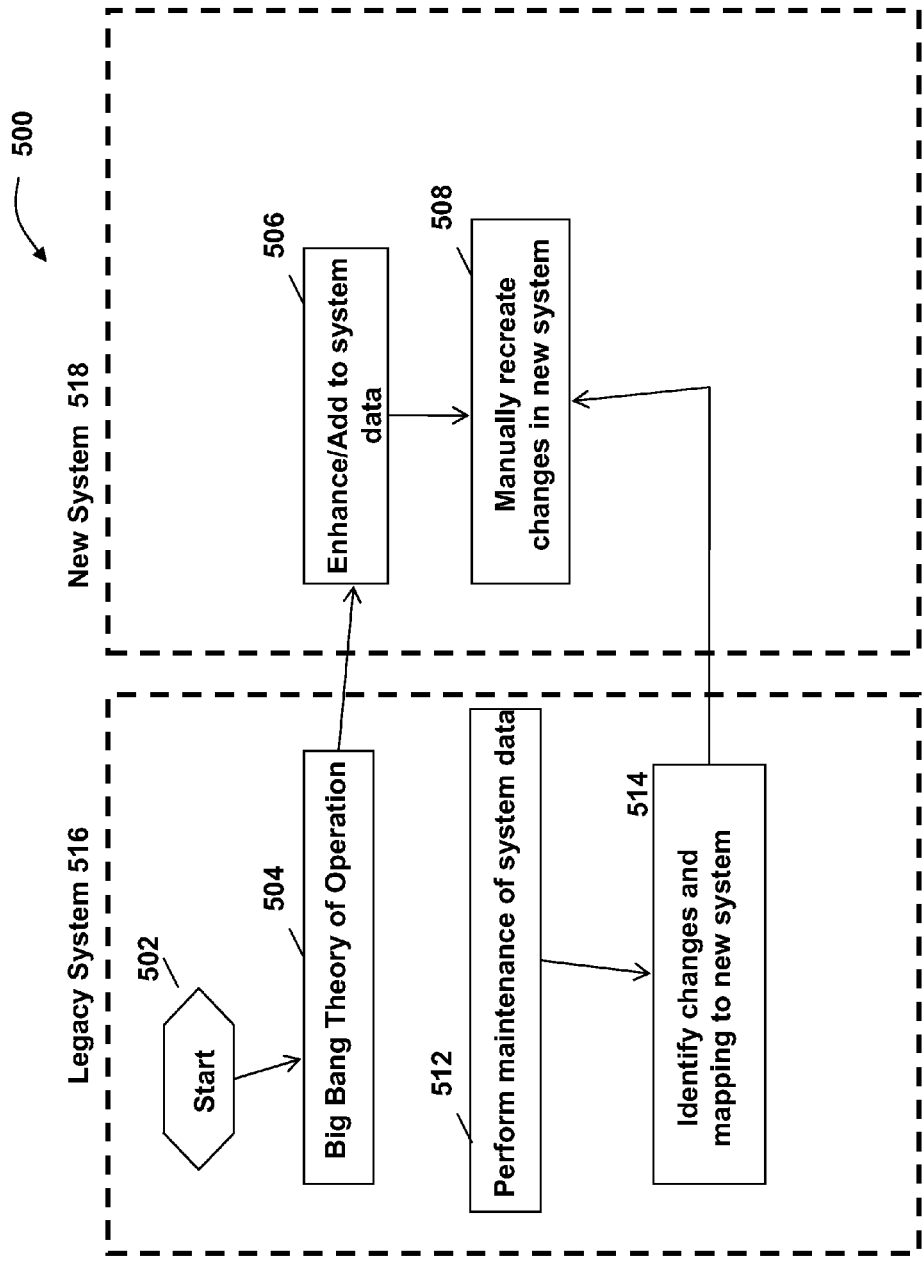
FIG. 5 shows the legacy system maintenance method of the prior art.
Figure 7:
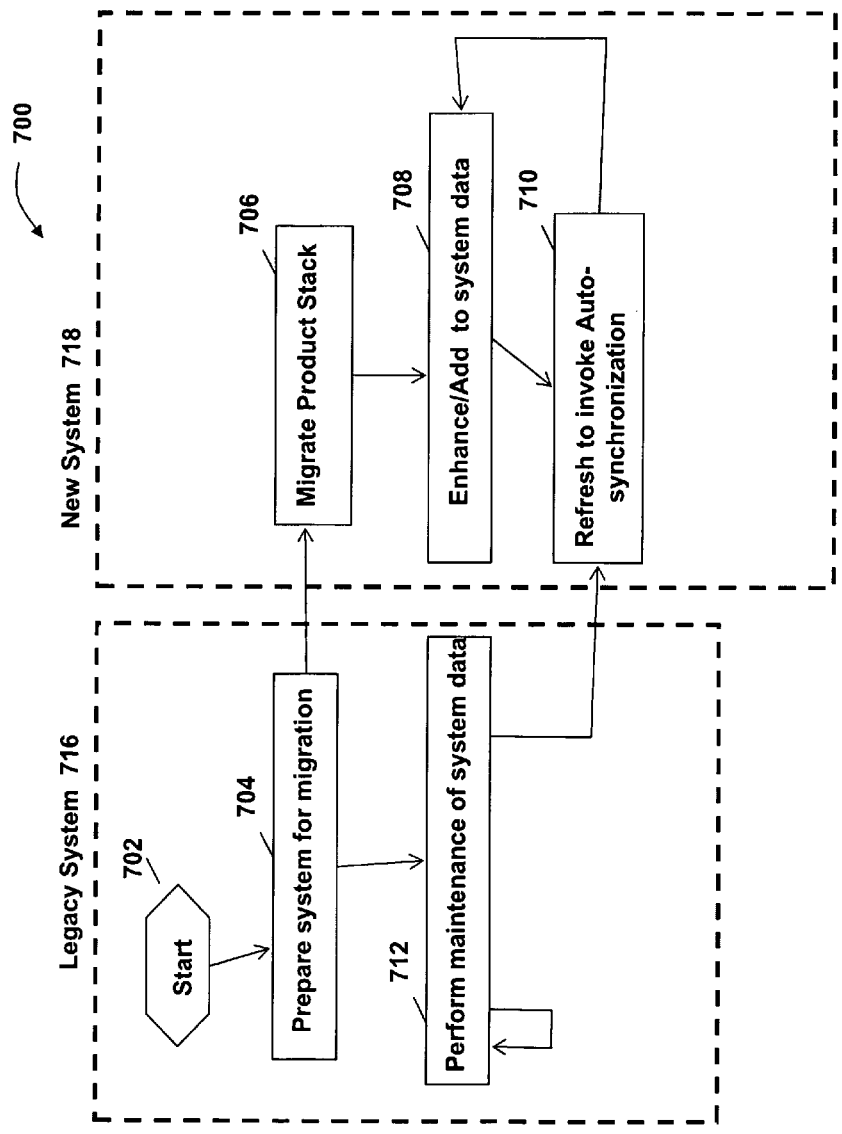
FIG. 7 shows the incremental migration theory of operation method of the present invention.

Now the "Big-bang migration" (as shown in FIG. 3) is no longer necessary since individual components can be migrated as needed. As is shown in FIG. 7, based on their release cycles or stability evaluation, specific components can be chosen to migrate (steps 704 and 706) given some criteria. At any given time during the incremental migration, the legacy system is still functional and can continue to be maintained (step 712). Auto-synchronization between the shadow components and their master ensures that changes to the legacy system are propagated into the new system (step 710).

Auto-synchronization implies that there is a discoverable mapping from the legacy format into the new system. To facilitate this, assumptions often need to be made which are acceptable in the process of the migration. This allows for a transparent import between the two systems without any user intervention or prompting. In fact, this is a pre-requisite for this paradigm to be operational. Given that this mechanism exists, it is also possible to perform a manual synchronization from a legacy component to a fully migrated component. In this case, the migrated component may have been editing in the context of the new system. The synchronization will then need to merge the changes made on the legacy side into the new system instead of merely replacing it. This merger will invoke some UI to resolve any conflicts similar to a team based scenario where two different developers modify the same source file.

Figure 8:
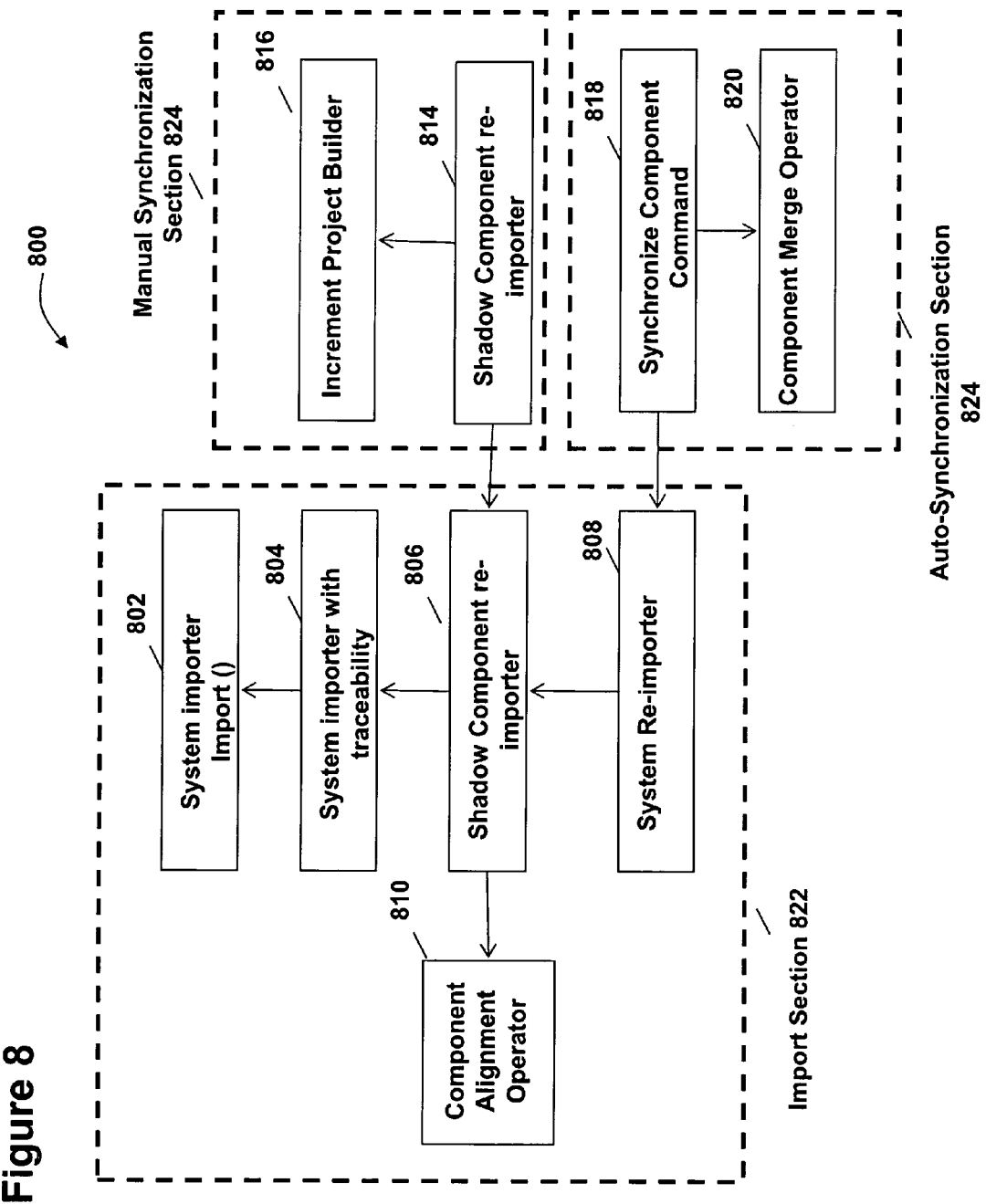
FIG. 8 shows an illustrative embodiment system of the present invention.
Figure 9:
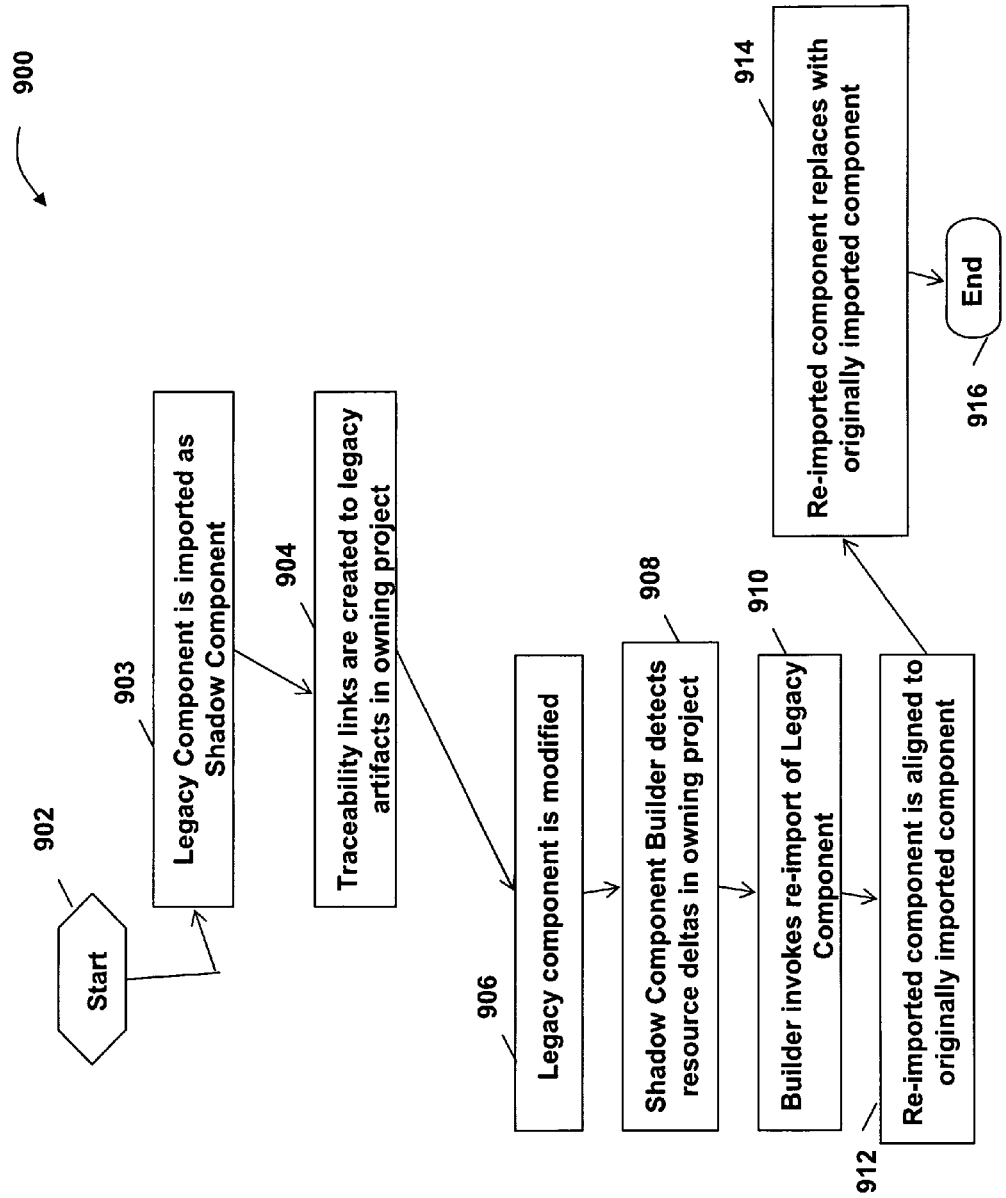
FIG. 9 shows the import and auto-synchronization method of the present invention.

There are three main aspects of the system and method of the present invention: an importer hierarchy for importing components, sub-components and re-import of the same (see Import Section 822 in FIG. 8); a shadow component builder (806, 814) for managing the resynchronization of the master component from the legacy system into the new system context (step 908) and a manual synchronization action (by Manual Synchronization Section 824) for allowing the user to resynchronize fully migrated components which may have been edited in the new system context. This allows for a merge UI to be invoked giving the user opportunity to manage the changes between the two systems.

If the system architecture from FIG. 6 is considered, the user wants to import the "Core 1" <<component>> 608 so that Product 3 610 may utilize the "Core 1" <<component>> 608. First, the legacy system component is imported via the "System Importer with Traceability" (810) command that imports the component and creates traceability links to the original legacy components with-in the project. This allows each newly imported artifact to have traceability to the legacy artifact that was originally imported. These short-cuts links allow the owning project to be able to detect changes in the original artifact which will prompt the auto-synchronization to occur. The "IncrementalProjectBuilder" is an abstract Builder then detects resource deltas with-in the owning project and feeds those deltas into a build API. The concrete class "Shadow Component Builder" checks for resource deltas which match the legacy artifact signature and have a linked resource in the project. If a match is found, the legacy component is triggered to be re-imported into the project. The re-imported artifact may have unique identifiers generated for contained contents that need to be realigned or matched back to the original imported artifact. The artifact is aligned to the originally imported artifact to make sure identifiers match up exactly.

This ensures that the re-imported component can directly replace the originally imported component and references to internal contents will remain intact.

If the legacy component is fully migrated, i.e., it is no longer designated as "mastered" in the legacy system, then the user is allowed to make changes to the component in the context of the new system.

Over time there will likely be divergence in the implementation between the legacy system data and the new system. However, if the legacy system is still "live" for maintenance or other reasons, the legacy system is also evolving—albeit at a slower rate. As a result, potentially, some changes in the legacy system may be candidates for migration into the new system. These changes need to be managed manually to ensure that they are integrated at the right time and that they integrate properly with the new system. When invoked, this would re-import the legacy component into the new system and perform an alignment similar to the shadow component auto-synchronization. However, since the new system may have been modified, the "Component Merge Operation" must be invoked to compare the newly imported component to the originally imported component. The differences are displayed in a visual merge facility allowing the user to discriminate as to how the changes should be merged and/or which changes to integrate.

It is important to note that these mechanisms for synchronization with the legacy system (such as Manual Synchronization Section 824 and Auto-Synchronization Section 826) are one way only. The new system has knowledge and/or dependencies to the legacy system, but the legacy system has no such dependencies into the new system. This lets the legacy system continue to operate without any special instrumentation or specific attention to the migration.

While shown and described herein as a system and method for a system and method for legacy system component incremental migration, it is understood that the invention further provides various alternative embodiments. For example, in one embodiment, the invention provides a computer-readable/useable medium that includes computer program code to enable a computer infrastructure to incrementally migrate components of legacy systems. To this extent, the computer-readable/useable medium includes program code that implements each of the various process steps of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory and/or storage system (e.g., a fixed disk, a read-only memory, a random access memory, a cache memory, etc.), and/or as a data signal (e.g., a propagated signal) traveling over a network (e.g., during a wired/wireless electronic distribution of the program code).

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method of migrating a legacy system to a new system, the method comprising:
    creating a shadow core component in the new system, wherein the shadow core component is a read-only shadow of a legacy core component in the legacy system, wherein operation of the shadow core component in the new system is mastered by operation of the legacy core component in the legacy system, wherein the legacy core component has no knowledge of the shadow core component in the new system;
    synchronizing the shadow core component in the new system in response to a change made to the legacy core component in the legacy system;
    operating at least one new component in the new system using the shadow core component in the new system;
    creating a set of traceability links between a set of artifacts of the shadow core component in the new system and a set of artifacts of the legacy core component in the legacy system;
    detecting the change made to the legacy core component in the legacy system using the set of traceability links; and
    initiating the synchronizing in response to the detecting, wherein the synchronizing uses the set of traceability links.

2. The method of claim 1, wherein the creating includes importing the legacy core component in the legacy system into the shadow core component in the new system, and wherein the synchronizing includes re-importing the legacy core component in the legacy system into the shadow core component in the new system.

3. The method of claim 1, further comprising automatically invoking the synchronizing in response to detecting the change made to the legacy core component in the legacy system.

4. The method of claim 1, further comprising operating at least one legacy component in the legacy system using the legacy core component in the legacy system concurrent with operating the at least one new component in the new system using the shadow core component in the new system.

5. The method of claim 1, further comprising managing a mapping between a legacy format of the legacy core component in the legacy system and a new system format of the new system, wherein the mapping is used to perform the synchronizing without any user intervention or prompting.

6. The method of claim 1, further comprising:
    migrating a final legacy component in the legacy system to a final new component in the new system, wherein the final legacy component in the legacy system is the last legacy component in the legacy system that uses the legacy core component to operate;
    operating the final new component in the new system using the shadow core component in the new system; and
    operating the shadow core component in the new system independent of the legacy core component in the legacy system after the migrating.

7. The method of claim 1, wherein the change comprises new product stack data for the legacy core component, and wherein the synchronizing includes enhancing product stack data for the shadow core component with the new product stack data from the legacy core component.

8. A system comprising:
    a computer system including at least one computing device, wherein the computer system is configured to implement a method of migrating a legacy system to a new system, the method comprising:
        creating a shadow core component in the new system, wherein the shadow core component is a read-only shadow of a legacy core component in the legacy system, wherein operation of the shadow core component in the new system is mastered by operation of the legacy core component in the legacy system, wherein the legacy core component has no knowledge of the shadow core component in the new system;
        synchronizing the shadow core component in the new system in response to a change made to the legacy core component in the legacy system;
        operating at least one new component in the new system using the shadow core component in the new system;
        creating a set of traceability links between a set of artifacts of the shadow core component in the new system and a set of artifacts of the legacy core component in the legacy system;
        detecting the change made to the legacy core component in the legacy system using the set of traceability links; and
        initiating the synchronizing in response to the detecting, wherein the synchronizing uses the set of traceability links.

9. The system of claim 8, wherein the creating includes importing the legacy core component in the legacy system into the shadow core component in the new system, and wherein the synchronizing includes re-importing the legacy core component in the legacy system into the shadow core component in the new system.

10. The system of claim 8, the method further comprising operating at least one legacy component in the legacy system using the legacy core component in the legacy system concurrent with operating the at least one new component in the new system using the shadow core component in the new system.

11. The system of claim 8, the method further comprising:
migrating a final legacy component in the legacy system to a final new component in the new system, wherein the final legacy component in the legacy system is the last legacy component in the legacy system that uses the legacy core component to operate;
operating the final new component in the new system using the shadow core component in the new system; and
operating the shadow core component in the new system independent of the legacy core component in the legacy system after the migrating.

12. A computer program product embodied in a computer readable storage medium, which when executed by a computer system including at least one computing device, enables the computer system to implement a method of migrating a legacy system to a new system, the method comprising:
creating a shadow core component in the new system, wherein the shadow core component is a read-only shadow of a legacy core component in the legacy system, wherein operation of the shadow core component in the new system is mastered by operation of the legacy core component in the legacy system, wherein the legacy core component has no knowledge of the shadow core component in the new system;
synchronizing the shadow core component in the new system in response to a change made to the legacy core component in the legacy system;
operating at least one new component in the new system using the shadow core component in the new system;
creating a set of traceability links between a set of artifacts of the shadow core component in the new system and a set of artifacts of the legacy core component in the legacy system;
detecting the change made to the legacy core component in the legacy system using the set of traceability links; and
initiating the synchronizing in response to the detecting, wherein the synchronizing uses the set of traceability links.

13. The program product of claim 12, wherein the creating includes importing the legacy core component in the legacy system into the shadow core component in the new system, and wherein the synchronizing includes re-importing the legacy core component in the legacy system into the shadow core component in the new system.

14. The program product of claim 12, the method further comprising operating at least one legacy component in the legacy system using the legacy core component in the legacy system concurrent with operating the at least one new component in the new system using the shadow core component in the new system.

15. The program product of claim 12, the method further comprising:
migrating a final legacy component in the legacy system to a final new component in the new system, wherein the final legacy component in the legacy system is the last legacy component in the legacy system that uses the legacy core component to operate;
operating the final new component in the new system using the shadow core component in the new system; and
operating the shadow core component in the new system independent of the legacy core component in the legacy system after the migrating.

16. A computer system including at least one computing device, the computer system including:
a new software system including a set of components; and
a migration software system configured to implement a method of migrating a legacy software system to the new software system, the method comprising:
creating a shadow core component in the new software system, wherein the shadow core component is a read-only shadow of a legacy core component in the legacy system, wherein operation of the shadow core component in the new software system is mastered by operation of the legacy core component in the legacy software system, wherein the legacy core component has no knowledge of the shadow core component in the new system;
synchronizing the shadow core component in the new software system in response to a change made to the legacy core component in the legacy software system, wherein operation of at least one new component in the new software system uses the shadow core component in the new software system;
creating a set of traceability links between a set of artifacts of the shadow core component in the new system and a set of artifacts of the legacy core component in the legacy system;
detecting the change made to the legacy core component in the legacy system using the set of traceability links; and
initiating the synchronizing in response to the detecting, wherein the synchronizing uses the set of traceability links.

17. The system of claim 16, further comprising the legacy software system, the legacy software system including:
the legacy core component; and
at least one legacy component operated using the legacy core component concurrent with the operation of the at least one new component in the new software system using the shadow core component in the new software system.

18. The system of claim 16, wherein the method further comprises:
migrating a final legacy component in the legacy system to a final new component in the new system, wherein the final legacy component in the legacy system is the last legacy component in the legacy system that uses the legacy core component to operate;
initiating operation of the shadow core component in the new software system independent of the legacy core component in the legacy software system after the migrating.

* * * * *